Sept. 22, 1959     E. C. HARTMAN     2,904,802

LOADING DOCK

Filed Dec. 24, 1956     4 Sheets-Sheet 1

INVENTOR.
ELMER C. HARTMAN
BY
ATTORNEY

Sept. 22, 1959  E. C. HARTMAN  2,904,802
LOADING DOCK
Filed Dec. 24, 1956  4 Sheets-Sheet 2

INVENTOR.
ELMER C. HARTMAN
BY
ATTORNEY

Sept. 22, 1959      E. C. HARTMAN      2,904,802
LOADING DOCK

Filed Dec. 24, 1956      4 Sheets-Sheet 4

INVENTOR.
ELMER C. HARTMAN
BY
ATTORNEY

United States Patent Office 2,904,802
Patented Sept. 22, 1959

2,904,802
LOADING DOCK

Elmer C. Hartman, Rochester, N.Y., assignor to Hartman Metal Fabricators, Inc., Rochester, N.Y., a corporation of New York Application December 24, 1956, Serial No. 630,410

17 Claims. (Cl. 14—71)

This invention relates to a power inclinable ramp. In a specific application of the invention, it relates to a loading dock having a power-inclinable ramp that is inclinable to engage on the bed or tailgate of a vehicle that has electrically controlled power means that are automatically maintained in operative driving relation to the ramp as the ramp inclines to conform to the elevation of the bed or tailgate of the vehicle.

Loading docks or platforms are usually built to a predetermined height which is selected for convenience of use with trucks and trailers most likely to be used with that particular dock or platform. However, even under ideal conditions, where only trucks and trailers of certain specified bed heights are employed, misalignment is frequent. Misalignment occurs because of a variety of factors, such as, for example, seasonal changes in road bed elevation, differences in vehicle tire inflation, differences in vehicle springing, and differences in vehicle loading. Thus, the bed of a vehicle, which is aligned with the loading dock when the vehicle is in an unloaded condition, will sink below the loading dock level as the vehicle is loaded.

To compensate for differences in elevation between the vehicle bed or tailgate surface and the loading dock surface, bridging members or devices are ordinarily employed. These vary in complexity from a simple plank to a convex ramp of sheet metal. All such devices presently available are makeshift in appearance, and in fact, have several unsafe features, and make more difficult the task of loading and unloading.

An object of the present invention is to provide a loading dock having a power-inclinable ramp that may be operated safely and simply to form a bridging connection between the dock and a vehicle.

Another object of the invention is to provide a loading dock with a power-inclinable ramp that is mounted to ride freely on a vehicle surface and to incline to conform to any change in the elevation of the vehicle surface, and whose power drive is automatically operated as the ramp's inclination changes, constantly to be in position to drive the ramp to a predetermined position should the vehicle be removed.

Still another object of the invention is to provide a safe power-inclinable ramp for a loading dock that may be inclined to engage on a surface, such as the tailgate of a vehicle, and that is automatically stopped at the zenith of its inclination, as a safety precaution, until it is manually returned to operation.

A related object of the invention is to provide a dock having a ramp inclinable to engage on the surface of a vehicle, and having control means so disposed that the ramp is automatically stopped after it is engaged on the vehicle, and when the vehicle's supporting surface is removed, the ramp is inclined to a previously selected inclination at which the ramp is automatically mechanically supported.

Yet another object of the invention is to provide a loading dock with a ramp which is movable by a power mechanism through a predetermined, limited arc.

Still another object of the invention is to provide a loading dock with a power-inclinable ramp which may be stopped manually at any angle of inclination.

Other objects of the invention will become apparent from the following detailed description of the invention and from the drawings. In the following description and in the drawings, a single specific embodiment of the invention is described and illustrated, which achieves the aforesaid objects of the invention.

In this illustrated embodiment of the invention, a loading platform is shown which is equipped with a plurality of identical loading docks, each having a power-driven ramp. Each ramp is hinged at its back to its dock so that it may be inclined.

Each dock is equipped with controls so that its ramp can be operated only in a certain, safe way. Each ramp in its at rest position is horizontal. From this position, the ramp may be moved initially only to elevate it. The controls are arranged so that after the appropriate control has been actuated to elevate the ramp, upward movement of the ramp will continue even if the control is released. As a safety precaution, the controls are arranged also so that the ramp is automatically stopped at the zenith of its elevation, to permit ample time for a vehicle to be positioned in a proper location beneath the ramp. Manual operation of the controls is again necessary to depress the ramp to engage on the vehicle. The movement of the ramp is automatically stopped when it engages on the vehicle, but as the elevation of the vehicle changes during loading or unloading, the power driving mechanism that moves the ramp is maintained automatically in operative driving relation so that it can support the ramp should the vehicle be removed suddenly. When the vehicle is removed, the controls are automatically actuated to return the ramp to its at rest, or horizontal position. As an additional safety factor, the controls are arranged so that when the ramp is in motion, it may be stopped, and its direction of travel reversed, through manual controls.

Structurally, each dock is provided with a reversible electric motor that is supported on the dock under the ramp. A transmission mechanism including a pair of telescoped tubes, spring-biased apart, is secured to the undersurface of the ramp. The outer of these tubes is secured directly to the ramp, while the inner tube is connected to the outer tube by a lost-motion mechanism. A sprocket is rotatably secured in the lower end of the inner tube and is engaged by a cable chain which is secured at one end to the frame of the dock and at its other end to a pulley that is driven by the electric motor. In operation, the motor either winds in or pays out the cable chain, depending on the direction in which its armature is driven.

The ramp when at rest is supported in a horizontal position by a supporting bracket which is engaged on a support socket assembly that is pivotally mounted on the frame. The socket assembly is mounted so that elevation of the ramp to its zenith automatically causes the socket assembly to pivot out of alignment with the supporting bracket, so that upon depression of the ramp, the socket is out of line with the bracket, and the ramp may be depressed below horizontal. At the nadir of its depression, a member on the ramp engages the support socket assembly and forces it to pivot back toward its aligned position, from which it is withheld by engagement between a cam on the socket assembly and a cam surface on the supporting bracket, and into which it is constantly urged by spring means as the ramp is elevated. As the ramp passes through horizontal, the cam surface is disengaged by the cam and the socket assembly can snap into aligned position.

Switch means are provided to control the operation of the device automatically. Thus, switch means are provided to cause the ramp to stop whenever it reaches the zenith of its elevation, and to reverse its direction of travel at the nadir of its depression. Other switch means are arranged on the power transmission mechanism and are so mounted that, as the inclination of the ramp changes to conform with any changes in the elevation of the vehicle surface on which it is engaged, the motor is started and stopped as necessary so that the power driving mechanism is maintained in operative driving relation to the ramp. The same switch means also functions on removal of the vehicle to start the motor to depress the ramp. Finally, a switch is mounted for actuation upon pivotal movement of the support socket to reverse the direction of the motor, so that as the ramp passes through horizontal and when the socket assembly snaps into aligned position, the ramp is depressed to bring the supporting bracket into engagement with the support socket. The switch means on the power transmission mechanism then stops the motor.

Manually operable switches are also provided to elevate, depress, and stop the ramp. The up and down manual controls are so arranged that elevation or depression continues automatically once the switch is actuated. However, the stop control is operative only so long as it is manually operated.

The details of construction of the device, and details of its operation, may be best understood by a consideration of the following detailed description thereof, taken together with the drawings.

Figure 1:
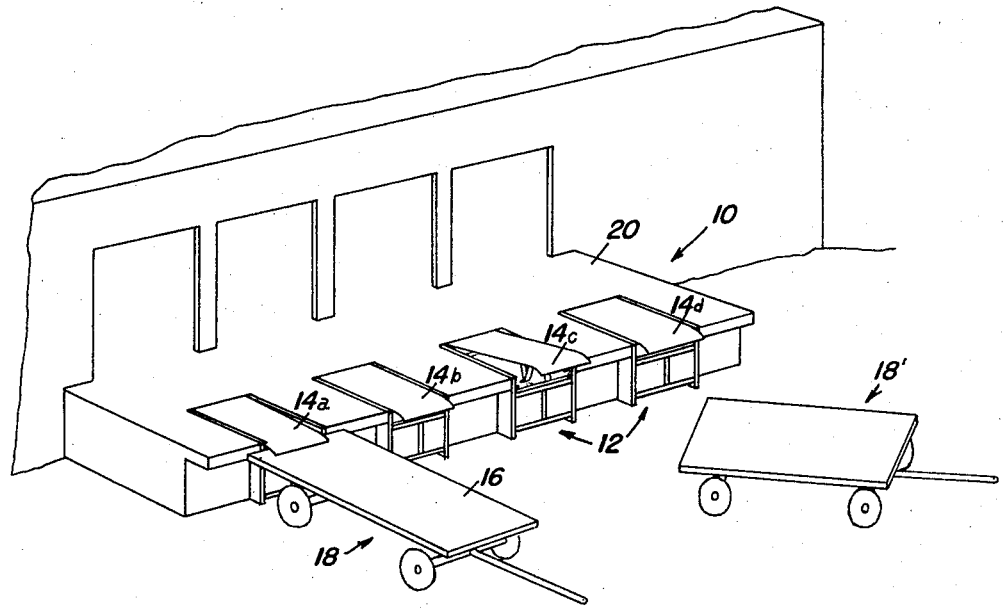
Fig. 1 is a perspective view of a loading platform provided with a plurality of docks constructed according to this invention.

Referring now in detail to the drawings, the loading platform 10 (Fig. 1) has a typical installation of a plurality of docks 12 that have power-driven inclinable ramps 14a, 14b, 14c, and 14d. The several power-driven ramps are shown at various inclinations to demonstrate their operation.

The ramp 14a is shown engaged on the surface 16 of a vehicle 18. The two ramps 14b and 14d respectively are supported in an inoperative, horizontal position flush with the deck 20 of the loading platform 10. The ramp 14c is stopped at the zenith of its elevation, awaiting the positioning of a second vehicle 18' beneath it.

The docks are all alike; and the following description, therefore, deals with one of them only.

Figure 2:
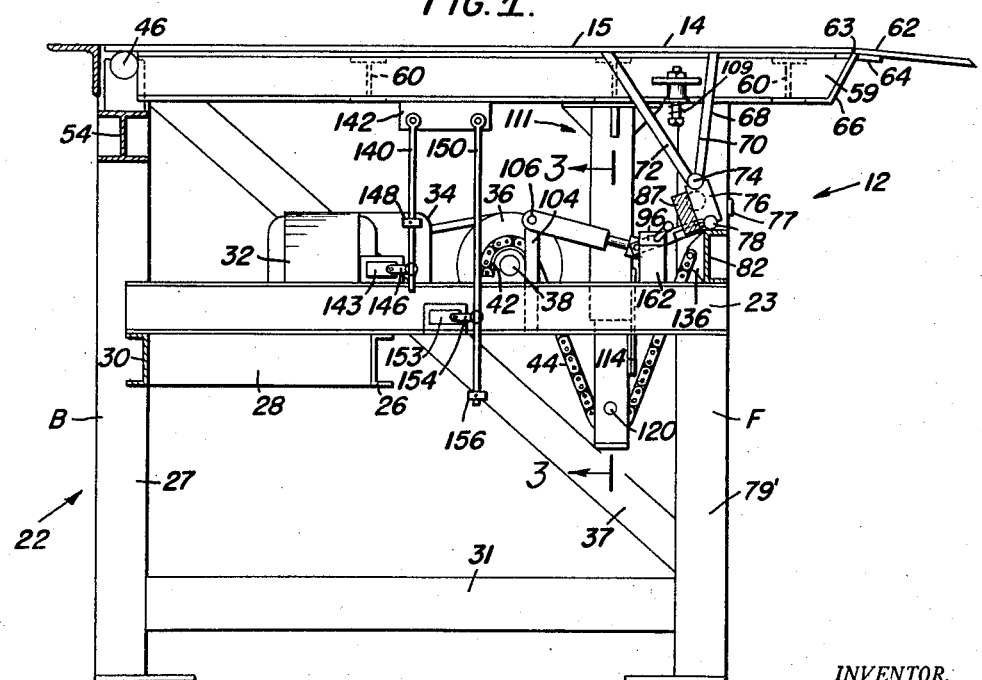
Fig. 2 is a section taken on the line A—A of Fig. 7 looking in the direction of the arrows, showing a dock constructed according to one embodiment of this invention, with its ramp supported in its at-rest, horizontal position.
Figures 4, 5:
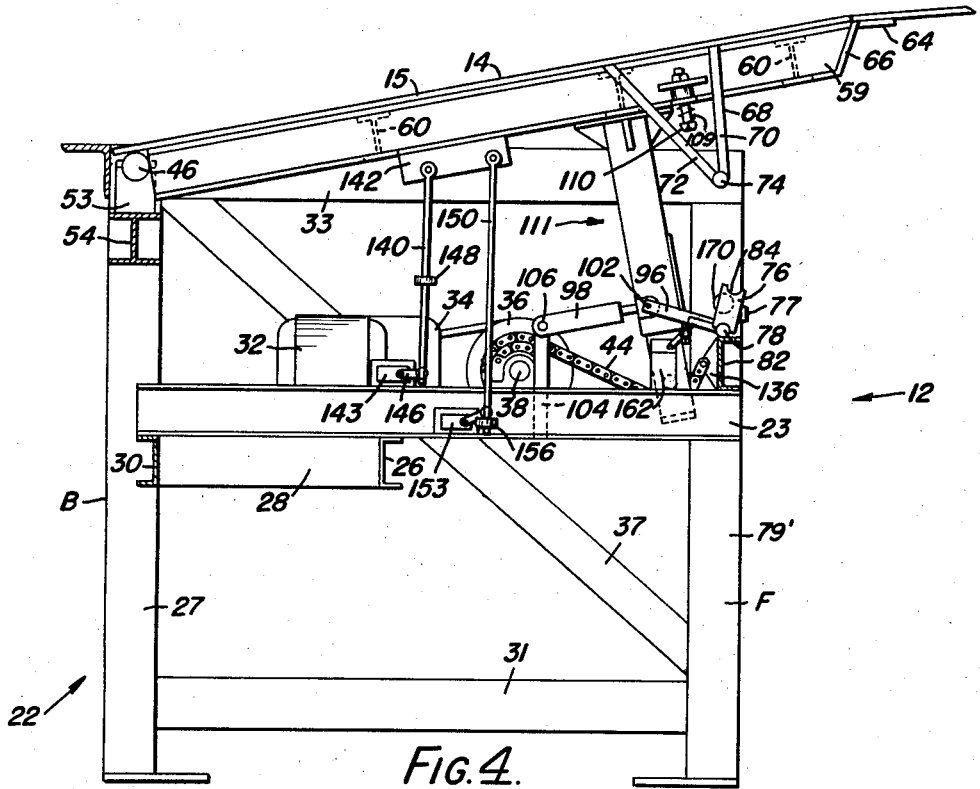
Fig. 4 is a section similar to that in Fig. 2 but showing the ramp in locked position at the zenith of its elevation.
Fig. 5 is a similar section showing the ramp depressed to its nadir position.
Figure 6:
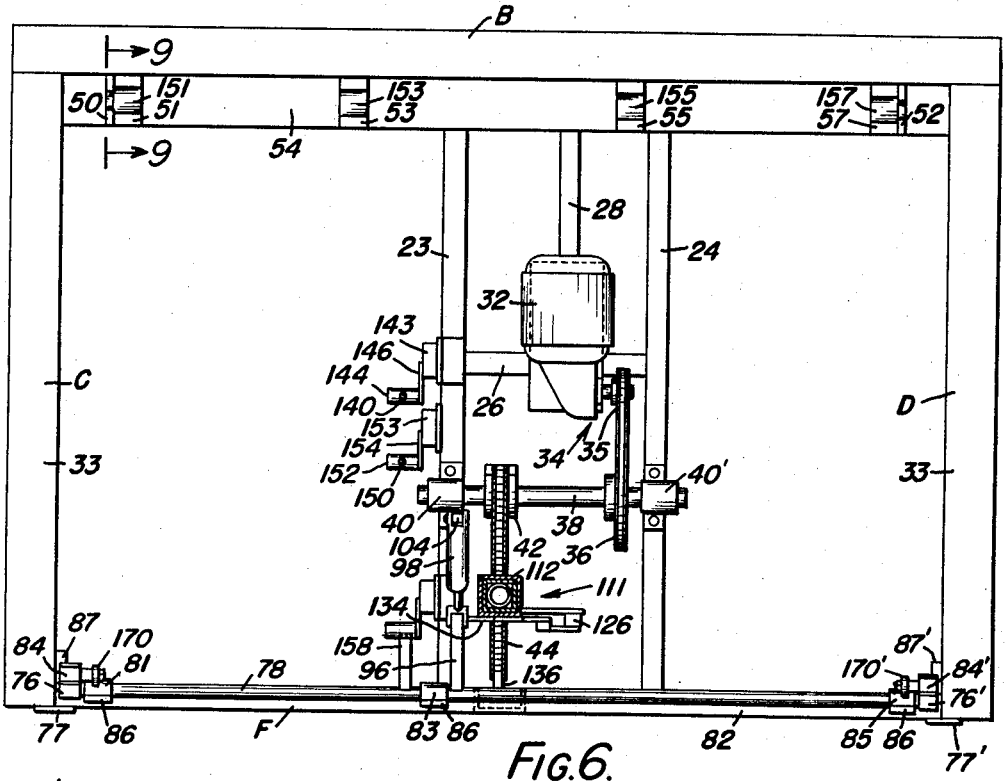
Fig. 6 is a top plan view of the dock with the ramp removed.

Referring now to Fig. 2, the dock 12 comprises a frame 22 constructed of interconnected steel structural members, including channels and I-beams, and having a front F, a back B, and two sides C and D (Fig. 6). Intermediate the height of the frame, a pair of spaced longitudinal girders 23 and 24 (Fig. 6) extend from the front to the back of the frame being suspended at their fronts from the transverse girder 82 (Fig. 7) and being supported at their rear ends by the transverse girder 30. Girder 82 is supported by uprights 79 and 79' (Fig. 7); and girder 30 is supported by two uprights, one of which is denoted at 27 (Figs. 4 and 5). Uprights 79 and 79' are connected near their feet by transverse bracing girders 29 (Fig. 7); and uprights 27 are connected with the uprights 79 and 79' near their feet by longitudinal bracing girder 31 (Figs. 4 and 5). The uprights 27 are connected at their tops to the uprights 79 and 79' by angle irons 33 (Figs. 6, 7 and 2) which extend from front to rear of the dock and which have their upper surfaces flat. Diagonally-extending braces 37 connect the upper rear ends of the angle irons 33 with the front uprights 79, 79' adjacent the lower braces 31.

A transverse girder 26 is secured beneath the girders 23 and 24 intermediate the ends thereof; and a short longitudinal girder 28 interconnects the transverse girder 26 with the transverse girder 30 which is mounted across the back of the frame.

The electric motor 32 is mounted on the transverse girder 26 and on the short girder 28, and is connected through a gear reduction, generally indicated by the numeral 34, a pulley 35, and a drive belt to a pulley 36. The pulley 36 is mounted on a driven shaft 38 that is journaled in bearings 40 and 40' respectively that are mounted on the two girders 23 and 24 respectively. A sprocket 42 is secured to the driven shaft 38. A cable chain 44 is secured at one end thereof to the sprocket 42 to be payed out or taken in on rotation of the sprocket.

Figure 9:
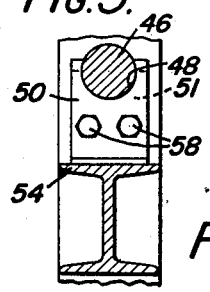
Fig. 9 is a section also on a somewhat enlarged scale, taken on line 9—9 of Fig. 6.

The deck 15 of the ramp 14 is made of heavy sheet metal and a heavy cylindrical shaft 46 is secured, as by welding, to the under-surface thereof adjacent the rear edge of the ramp. The shaft 46 is rotatably journaled in a plurality of bearing supports 51, 53, 55 and 57 (Figs. 6 and 9) that are mounted on a transverse girder 54 and that are spaced at intervals across the back of the dock. Each bearing support has a channel 151, 153, 155 and 157, respectively (Fig. 6) in which the shaft 46 is rotatably supported. Two hold-down plates 50 and 52 respectively are apertured to receive the shaft 46 and are mounted one on each side of the dock. The hold-down plate 50 is removably secured to the bearing support 51 on one side of the dock by bolts 58 (Fig. 9). As shown, when the shaft 46 is inserted in the aperture 48 on the hold-down plate 50, the marginal edges of the hold-down plate extend upwardly beyond the center line of the shaft 46 to engage the shaft so that it cannot be lifted vertically from the hold-down plate. The other hold-down plate 52 is removably secured to the bearing support 57 at the opposite side of the dock and engages the shaft 46 in a similar manner.

A network of an interconnected longitudinal girder 59 (Fig. 2) and transverse girders 60 is secured to the under-surface of the deck 15 of the ramp 14 to give it structural strength. A lip portion 62 is secured to the front edge of the deck 15 by a buttweld 63 and a lap bar 64 is welded to the lip, and to the deck on the undersurfaces thereof. The longitudinal girder 59 terminates approximately under the front edge of the ramp 15, and a small protective sheet 66 is mounted over the end of the girder 59 and is secured to the lip 62 along the buttweld 63.

Figure 7:
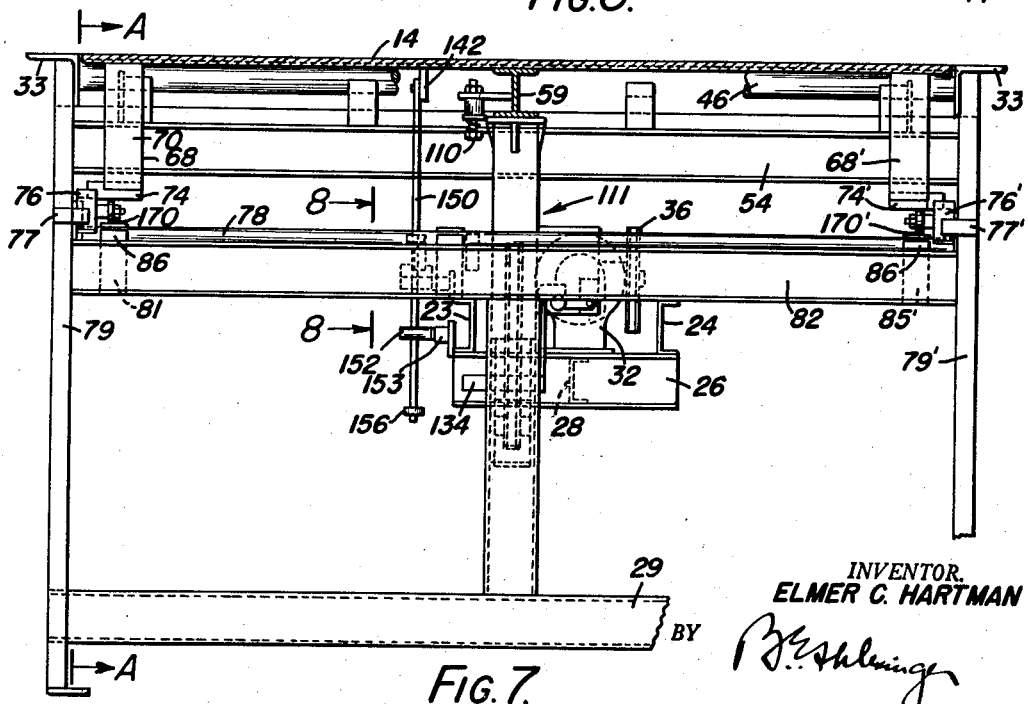
Fig. 7 is a front elevation of the dock with the ramp in the position of Fig. 2, and with the lip of the ramp broken away.

Two triangular supporting brackets, 68 and 68' respectively (Fig. 7), are secured on the undersurface of the deck 15, one at each side thereof. The two brackets are mirror images. The bracket 68 comprises a front, downwardly depending bar 70 secured to the ramp and slightly inclined to the rear, and a second column or brace 72 also secured to the ramp but inclined to the front (Fig. 2). At their lower extremities, the column 70 and the brace 72 are each secured, as by welding, to a pin 74 of circular cross-section. The column and brace of the second bracket 68' are similarly secured to a pin 74' (Fig. 7).

Two socket plates 76 and 76' respectively are secured to a shaft 78 extending transversely of the frame along the front thereof, one at each end of the shaft. The shaft 78 is journaled for rotary movement relative to the frame in a plurality of bearing assemblies 81, 83, and 85 (Fig. 6) mounted at spaced intervals on the transverse channel girder 82.

Figure 8:
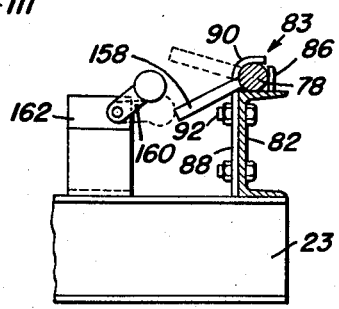
Fig. 8 is a section, on a somewhat enlarged scale, taken on line 8—8 of Fig. 7.

Each of the bearings 81, 83, and 85, respectively, in which the shaft 78 is journaled, includes a small front strap 86 (Fig. 8) which is secured directly to the transverse channel girder 82, at the front thereof, and a back retainer plate 88 having a turned-in upper end 90 which is shaped at its upper end to conform generally to the contour of the shaft 78. The back retainer plate 88 is removably secured to the web of the girder by bolts indicated generally by the numeral 92.

The socket plate 76 is formed with a socket 84 (Fig. 4) which may be aligned, as shown in Fig. 2, to receive the pin 74 of the bracket 68. The socket plate 76' has a corresponding socket to receive the pin 74' of the bracket 68'. Each socket plate is mounted on the transverse shaft 78 for movement upon rotation of the shaft.

Front stop members 77 and 77' (Fig. 7) are secured to the column 79 of the frame to engage the socket plates 76 and 76' to limit their forward tilting movement and to limit the clockwise rotation (Fig. 2) of the shaft 78. Back stop members 87 and 87' are also secured on the columns 79 and 79', respectively, to engage the socket plates 76 and 76' to limit their movement when the shaft 78 is rotated in the opposite direction. Thus, the movement of the shaft 78 and the two socket plates 76 and 76' secured thereon is limited to an arc determined by the positions of the respective stop members.

Two wheels 170 and 170' (Figs. 4 and 6), respectively, are rotatably mounted, one on each socket plate 76 and 76', respectively, to ride on the bars 70 and 70', respectively, of the brackets 68, 68', respectively, during elevation of the ramp from its nadiral position to horizontal. The bars 70, 70' are so proportioned that this engagement terminates as the ramp passes through horizontal.

The sockets 76 and 76' are rocked about the axis of shaft 78 by a toggle that is interposed between the shaft 78 and the longitudinal girder 23 of the frame 22. The toggle includes a first link 96 (Fig. 4), which is rigidly secured to the transverse shaft 78, and a second link 98 that consists of a pair of telescoping members, the inner of which is spring-pressed outwardly. The second link is pivotally connected to the link 96 by a pivot pin 102. A post 104 is secured to and extends upwardly from the longitudinal girder 23. The second link 98 is pivoted on the post 104 by a pin 106. The pin 106 is mounted with its axis at approximately the same height as the axis of the shaft 78. Thus, the toggle pivots on one side or other of horizontal.

A trip stud 110 (Fig. 4) is mounted on the girder 59 to engage the link 96 of the toggle joint to snap the toggle from the position of Fig. 4 to that of Fig. 5 when the platform is at its nadiral position. The trip member 110 may be spring-cushioned by spring 109 as shown.

Figure 3:
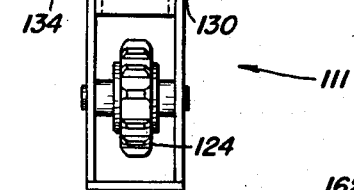
Fig. 3 is a section on an enlarged scale taken on line 3—3 of Fig. 2.

A transmission assembly 111 (Figs. 4, 5 and 6) is secured to the girder 59 between the drive shaft 38 and the front of the dock. The transmission assembly (Fig. 3) includes an outer hollow post 112 of square cross-section that is secured to the girder 59, and an inner post 114, of corresponding square cross-section, that telescopes in the post 112 and projects downwardly beyond the end of the outer post. A coil spring 116 (Fig. 3) is mounted in the bores of the telescoped posts and is interposed between the top of the post 112 and a pin or plug 118 which is secured transversely in the walls of the inner post 114, to press the telescoped posts apart. A lower pin 120 is mounted in the walls of the post 112 and passes through an axial slot 122 in the walls of the inner post or transmission member 114, to provide a lost-motion connection between the two posts. A sprocket 124 is rotatably mounted in the lower extremity of the member 114 to be engaged by the chain 44 (Fig. 5).

An electrical switch 126 is secured on the outer post 112, with its operating lever 128 spring-biased upwardly. At the intermediate position of the lever 128, no contact is made. In the uppermost position of the lever, the switch 220 (Fig. 10) is closed; and in the lowermost position thereof, the switch 210 is closed. A bar 130 is mounted on the inner post 114 just above sprocket 124. This bar has an upwardly extending hooked arm 132 mounted to engage the operating lever 128 to actuate the switch 126. The bar 130 has a lateral extension 134 on the opposite side of the post 114 to engage the toggle bar 96 to move the toggle above horizontal, as shown in Fig. 4.

The cable chain 44 extends from the end that is secured to the sprocket 42 around the sprocket 124 (Fig. 3) on the post 114, and at its opposite end, is secured to a plate 136 mounted on the rear of the girder 82.

The switch, which limits the downward movement of the dock, is an automatic reversing switch 143. It is adapted to be tripped by a depending rod 140 which is pivotally mounted on a plate 142 (Fig. 4) that is secured beneath the girder 59. A short tubular member 144 (Fig. 6) is rotatably mounted on the operating lever 146 of the reversing switch 143 and is apertured for the passage therethrough of the rod 140. A collar 148 is adjustably mounted on the rod 140 to engage the tubular member 144 at the nadiral position (Fig. 5) of the ramp to depress the operating lever 146 to actuate the switch 143 to reverse the electric motor 32.

The switch which limits upward movement of the dock is denoted at 153. It is a normally closed switch. It is tripped by a depending rod 150 that also is pivotally secured to the plate 142. A tubular member 152 is rotatably secured to the switch operating lever 154 of the switch 153, and is apertured for the passage therethrough of the rod 150. A collar 156 is adjustably mounted on the rod 150 to engage the tubular member 152 to lift the operating lever 154 upwardly as the ramp reaches the zenith of its elevation (Fig. 4). The switch arm 154 moves upwardly to open the normally closed switch to stop the ramp at its most elevated position.

A level-lock mechanism is provided to "park" the ramp in horizontal position, at rest. The mechanism includes a lever arm 158 (Fig. 8) that is secured to the transverse shaft 78 and that projects radially therefrom. This lever trips the operating lever 160 of a normally-closed switch 162 which is mounted on the girder 23. The operating lever 160 is spring biased upwardly, to be engaged and moved downwardly by the lever arm 158, as the ramp descends, thereby to open the switch 162. Engagement occurs as the socket plates 76 and 76' are moved by the toggle member into alignment with the pins 84 and 84' of the supporting brackets 68 and 68' for reception of those pins.

Figure 10:
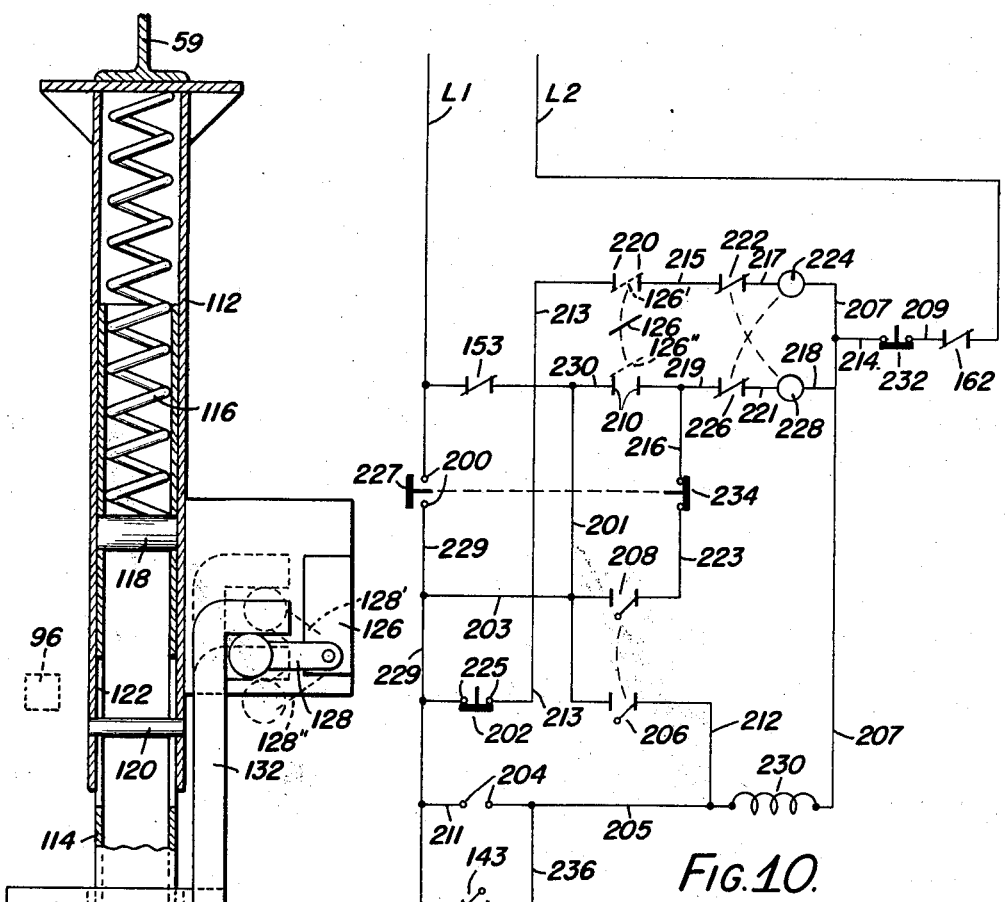
Fig. 10 is a schematic electrical diagram showing how the dock is wired.

One way in which the dock may be wired electrically to accomplish its purpose is illustrated diagrammatically in Fig. 10. The manually-operable controls include an up button 204, a down button 200, and a stop button 232. A relay coil 230 is provided to control the two switches 206 and 208. The main lines are denoted at L1 and L2. Solenoids 224 and 228 are provided to control the direction of operation of the motor 32.

The operation of the dock will now be explained, assuming that the initial position of the ramp is that shown in Fig. 2, with the ramp supported in horizontal position through engagement of its supporting brackets 68 and 68' on the socket plates 76 and 76' respectively. When the ramp is in this position, which is the at rest or level-locked position, the switch operating lever 128 (Fig. 3) for the switch 126 is at its intermediate position, and terminals 210 and 220 (Fig. 10) are both open.

To start the ramp, the normally-open manually operable up button 202 is pushed to bridge the terminals 204. This closes a circuit from the line L1 through the normally-closed up limit switch 153, lines 201, 203, and 211, the now-closed switch 202, terminals 204, line 205, relay coil 230, lines 207 and 214, normally-closed stop button 232, line 209, normally-closed switch 162, to line L2. Thus, the relay coil 230 is energized, and the relay switches 206 and 208 are closed. Closing of the switch arm 208 closes a circuit to solenoid 228 from line L1 through switch 153, line 201, now-closed switch arm 208, line 223, normally-closed switch 234, lines 216 and 219, normally-closed switch 226, line 221, solenoid 228, line 218, line 214, normally-closed button 232, line 209, switch 162 and line L2. Closing of switch arm 206 maintains a hold-in circuit to coil 230 when the manually-operable up button 202 is released. This circuit is from line L1 through the normally-closed switch 153, line 201, through the now-closed relay switch 206, line 212, coil 230, lines 207 and 214, switch 232, line 209, switch 162, and line L2.

The solenoid 228, when thus energized, operates through its armature to open automatically the switch 222 to prevent any current flow in the other solenoid coil 224. The energization of the solenoid also operates through a conventional connection (not shown) to actuate the motor 32 to drive the sprocket 42 in the proper direction to take in the chain 44, that is, to wind it around the sprocket 42.

Since the chain 44 (Fig. 2) is secured at its opposite end to the plate 136, the winding-up of the chain causes the chain to exert an upward force on the lower end of the inner post 114 (Figs. 2 and 3) since the chain bears against the sprocket 124. This upward force causes the inner post 114 to telescope into the outer post 112 against the resistance of the spring 116, until the pin 120 engages the lower end of the slot 122. When that occurs, the lifting force exerted by the cable chain is transmitted directly through the telescoped posts to the girder network supporting the ramp, and the ramp 14 is moved upwardly.

As the inner post 114 is moved up, it carries the bar 130 and its upwardly extending arm 132 upwardly, permitting the operating lever 128 of switch 126 to be forced by its spring (not shown) into its uppermost position 128', to cause the switch 126 to bridge the terminals 220 in the position indicated in dotted lines at 126' in Fig. 10.

As the ramp is inclined upwardly, also, the rod 150 is carried upwardly. As the ramp reaches the zenith of its elevation, the collar 156 on the rod 150 engages against the lower surface of the cylinder 152 (Fig. 6) and moves the switch operating lever 154 up, to open and hold open the normally-closed up limit switch 153. This breaks the circuit and stops the motor 32. The relay coil 230 and the solenoid coil 228 are, therefore, de-energized. The ramp stops its movement and remains at the zenith of its elevation. The ramp is supported in this position only by the chain 44 and its drive mechanism. This automatic parking of the ramp at the zenith of its elevation permits a vehicle to maneuver to locate its bed or tailgate under the ramp without danger of collision with the ramp.

As the ramp is elevated, the lateral extension 134 of the bar 130 engages against the undersurface of the toggle bar 96, and as the upward movement of the ramp continues, the arm forces the bar up and moves the toggle from the position below horizontal, illustrated in Fig. 2, to the position above horizontal, shown in Fig. 4. As the toggle is moved, it rotates the shaft 78 and shifts the position of the socket plates 76 and 76', from the receptive position shown in Fig. 2 to the position shown in Fig. 4, in which the sockets are out of alignment with the bracket pins 74 so as to permit the ramp to be moved freely below the horizontal position.

After the vehicle has been backed against the loading dock under the elevated ramp 14, the manually operated down button 227 (Fig. 10) is pushed to bridge the terminals 200. This makes a circuit from the main line L1 through the now-bridged terminals 200, line 229, normally-closed switch 202, line 213, through the switch 126, which is now in the position 126' bridging the terminals 220, the line 215, the switch 222, which has closed upon deenergization of solenoid 228, line 217, the solenoid coil 224, line 207, switch 232, line 209, switch 162, and line L2. When the solenoid coil 224 is energized, the switch 226, in series connection with the solenoid coil 228, is opened to prevent the flow of current through that coil 228. Energization of solenoid coil 224 also operates through a conventional connection to actuate motor 32 to drive sprocket 42 in such direction as to pay out chain 44 from the sprocket 42. The weight of the ramp maintains the coil spring 116 under compression, and the pin 120 continues to engage against the lower end of the slot 122. Thus, there is no relative movement between the two telescoped posts 112 and 114, and the switch operating lever 128 remains in its uppermost position so that the switch 126 remains in position 126' bridging terminals 220.

When the manual down button 227 is released, this button immediately resumes its normally open position, but the switch 234, which is connected with it closes as shown in Fig. 10.

As the ramp moves downwardly, the collar 156 (Fig. 4) on the rod 150 will move down, disengaging the switch operating lever 154, and permitting the up limit switch 153 to resume its normally-closed position. Thus, a circuit will be made through the line L1, the now-closed switch 153, lines 201, 203, and 229, button 202, line 213, now-closed switch 220, line 215, now-closed switch 222, line 217, solenoid coil 224, lines 207 and 214, switch 232, line 209, switch 162, and line L2.

If the lip 62 of the ramp engages on the bed or tailgate of a vehicle as the ramp descends, the ramp will be mechanically supported on the engaged surface of the vehicle. However, the circuit momentarily remains closed, and the motor 32 continues to cause the sprocket 42 to pay out chain. As the chain is payed out the coil spring 116 expands to force the inner post 114 down, and the upwardly extended arm 132 is also carried down to force the switch operating lever 128 into its intermediate position to cause the switch 126 to break contact with the terminals 220. This breaks the circuit, and stops the motor. The solenoid 224 is also de-energized.

If the vehicle is being unloaded, its tailgate will gradually rise as the load is removed. As the springs of the vehicle force the tailgate upwardly, the ramp will be carried upwardly also. As the ramp moves up, though, the coil spring 116 constantly forces the inner post 114 down so that the sprocket or pulley 124 remains engaged with the chain. If the ramp moves up far enough, the relative movement between the outer post 112 and the inner post 114 will cause the arm 132 to force the switch operating lever 128 into its lowermost position so that the switch 126 will bridge the terminals 210 in its position 126" (Fig. 10). Thus, a circuit will be made from the line L1 through the normally closed switch 153, line 230, the now-bridged terminals 210, line 219, the normally-closed switch 226, line 221, the solenoid 228, lines 218, 207 and 214, switch 232, line 209, switch 162, and line L2. This actuates the motor 32 to rotate the sprocket 42 to take in chain. As chain is taken in, the inner post 114 is forced up to compress the spring 116 further, and the arm 132 is moved up to permit the switch operating lever 128 to move into its intermediate position to open the switch 126 again, breaking contact at terminals 210 thereby breaking the circuit and stopping the motor again.

If the vehicle is being loaded or is reloaded, its bed drops downwardly as the vehicle springs are compressed. The ramp conforms to the elevation of the vehicle and drops down with it. As the ramp moves down, the coil spring 116 is compressed as the outer post 112 is telescoped downwardly around the inner post 114. As the outer post 112 moves down, while the inner post 114 is supported on the chain by the sprocket 124, the switch 126, which is carried by the outer post 112, will move down relative to the now stationary arm 132. If the descent of the tailgate and of the ramp are sufficient, this will enable the switch operating lever 128 to move upwardly to its uppermost position to move the switch to its position 126' to bridge terminals 220 (Fig. 10). This closes the circuit which causes the motor 32 to drive the sprocket 42 in the direction to pay out chain. Since the ramp is engaged and supported on the vehicle, it is not responsive to paying out of the chain. Thus, as the chain is payed out, the outer post 112 remains stationary with the ramp, while inner post 114 is forced down by the coil spring 116. As the post 114 is moved down, the arm 132 engages on the switch operating lever 128 again and forces it to its intermediate position to open the circuit across terminals 220 again. This stops the motor 32 again and deenergizes the solenoid coil 224.

This sequence of stopping and starting the motor continues as necessary during the loading and/or unloading of the vehicle so that the chain is kept taut around the sprocket 124.

When the vehicle is removed, the ramp is no longer supported and it drops down until the pin 120 (Fig. 3) engages on the lower end of the slot 122. As the ramp drops down, the coil spring 116 is compressed, and the switch operating lever 128 is carried away from the now stationary arm 132, which is supported with inner post 114 by chain 44. This permits lever 128 to move to its uppermost position to shift switch 126 to position 126' (Fig. 10) to bridge the terminals 220. This closes the circuit to the motor 32 again and causes the motor to rotate the sprocket 42 in the direction to pay out chain. The circuit formed when the switch 126 bridges terminals 220 has been described above.

As the ramp moves downwardly, approaching the nadir of its depression, the spring-cushioned rod 110 (Figs. 4 and 5) engages against the bar 96 of the toggle, and as the ramp continues to move down, the toggle is forced below horizontal from the position shown in Fig. 4 to that of Fig. 5. As the toggle is forced below horizontal, the transverse shaft 78 is forced to rotate, and the sockets 76 and 76', that are secured on the shaft, are rotated through an arc until the wheels 170 and 170' engage against the front surfaces of the legs 70, 70' of the brackets 68 and 68'. The engagement of the wheels 170 and 170' against the rods 70, 70' prevents the sockets 76, 76' from returning to the at rest position shown in Fig. 2.

The ramp is lowered as the chain is payed out, and as it approaches the nadir of its depression, the collar 148 (Fig. 5) on the rod 140 engages on the cylinder 144 (Fig. 6) that is secured to the switch operating lever 146 to close the normally-open down limit switch 143 (Fig. 10).

Simultaneously or immediately after the switch 143 is closed, the ramp engages on the transverse girder 82 of the dock (Fig. 5) and is mechanically supported thereby.

Since the ramp is now mechanically supported, but the motor is still paying out chain, the coil spring 116 (Fig. 3) forces the inner post 114 down, and the arm 132 engages on the switch operating lever 128 and moves it down to its intermediate position to move the switch 126 out of engagement with the terminals. Thus, the circuit to the motor is broken and the solenoid coil 224 is de-energized, permitting the switch 226 to close.

When the switch 143 is closed, a circuit is made from the line L1, through the normally-closed up limit switch 153, lines 201, 203 and 229, the now-closed down limit switch 143, lines 236 and 205, the relay coil 230, line 207, the normally-closed manual stop switch 232, line 209, normally-closed switch 162, and line L2. When the relay coil 230 is energized, the relay switches 206 and 208 are closed.

The closing of switch arm 206 closes a holding circuit to the relay as described previously. The closing of switch arm 208 establishes, as also previously described, a circuit from the line L1, through the normally-closed switch 153, line 201, the now-closed down relay arm 208, line 223, normally-closed switch 234, line 216 and 219, the now-closed switch 226, line 221, the solenoid coil 228, lines 207 and 214, the normally-closed manually-operable stop switch 232, line 209, normally-closed switch 162, and line L2.

The motor 32 is thus again actuated to drive the sprocket 42 (Fig. 6) so that chain is wound in and the ramp is moved up. As the ramp is moved up, the collar 148 (Fig. 5) on the rod 140 disengages the cylinder 144 on the switch operating the lever 146, to open the down limit switch 143. The hold-in circuit through relay arm 206 still permits current to flow, however, to coil 230 and the motor 32 still continues to run.

Elevation of the ramp continues from the lowermost position, without other change, until the ramp passes through its horizontal position. The spring, that is concealed within the telescoping bar 98 of the toggle, constantly urges the toggle to an extreme position below horizontal and thus maintains the wheels 170 and 170' engaged against the rods 70, 70' as the ramp is moved up.

As the ramp passes through its horizontal position, the wheels 170 and 170' become disengaged from the rods 70, 70' of brackets 68 and 68', and the toggle snaps down under actuation of its spring, rotating the shaft 78 and shifting the sockets 76 and 76' into a position to receive the pins 74 and 74' of the support brackets. At the same time, the radially-directed lever arm 158 (Fig. 8) on the transfer shaft 78 is moved through an arc, and during its movement it engages the operating lever 160 of switch 162, first opening the switch 162 and then releasing it. The operating lever 160 is spring biased upwardly, and the lever 158 moves it out of its normal position only momentarily, and it immediately resumes its normal position to close the switch 162 after it is disengaged from the lever arm 158.

Thus, the switch 162 is opened only momentarily by the movement of the switch operating lever 160. When the switch 162 is opened, the circuit is broken, and the relay coil 230 is de-energized so that the relay switches 206 and 208 open. The solenoid 228 is also de-energized, permitting the switch 222 to close.

When the switch 162 closes again, a circuit is made from the line L1, through the normally-closed up limit switch 153, lines 201, 203 and 229, switch 202, line 213, the terminals 220 now bridged by switch 126 in its position 126', line 215, the now-closed switch 222, line 217, through the solenoid coil 224, line 207, through the normally-closed manual stop switch 232, line 209, now-closed automatic level switch 162, and line L2.

The closing of this circuit and the energization of the solenoid 224 causes the motor to drive sprocket 42 in the direction to pay-out chain. The ramp is therefore reversed and lowered until the pins 74 engage in the sockets 84 in the socket plates 76 and 76' respectively to support the ramp on the frame. After the ramp is thus supported on its frame, the motor continues to pay out cable chain and the compressed coil spring 116 expands to force the inner post 114 down. The outer post 112 is held stationary with the ramp. Thus, the arm 132 engages the switch operating lever 128 and forces it down to its intermediate position to break the circuit through terminals 220. This stops the motor, and the ramp is supported mechanically on its frame in a position where the ramp is flush with the back of the loading platform.

The ramp is thus at rest, in the position where the cycle of operation was started, and is ready for further use when desired.

If the dock should be put into operation, as described above, and the vehicle, which is to be loaded or unloaded, is not in proper position under the ramp, after the ramp has been started down from the zenith of its elevation, the ramp will simply continue its downward movement to the nadir of its depression, where the down limit switch 143 will close, as above described, by engagement of the collar 148 against the cylinder 144 on the switch operating lever 146. The sequence of events already described will then take place to cause the motor to reverse the ramp to reverse its direction of travel; and the operation of the ramp mechanism already described will take place to move the ramp to and through horizontal, then reverse the direction of the motor 32, and settle the support bracket pins 74, 74' in the sockets 80, 80' of the socket plates 76, 76', and then the motor will be turned off, all automatically.

At any time during the operation of the device, as is obvious from the circuit diagram in Fig. 10, manual controls may be employed to stop the ramp, or to reverse its direction of travel. Thus, for example, if it is desired to have the ramp continue its upward direction of travel from the nadir of its depression, instead of having it assume its level locked position, it is merely necessary to hold down the manual up switch 202 in bridging engagement with the terminals 204. Then, although the switch 162 is opened briefly as the ramp travels through its horizontal position, when the switch 162 again closes, the circuit including the relay coil 230 is still a complete circuit, the relay switches 206 and 208 close again, and the solenoid 228 is again energized so that the same direction of upward travel is maintained.

There has thus been described a specific embodiment of the invention which fufills all of the objects thereof. In the embodiment described, three stopped or parked positions of the ramp are possible. First, the ramp stops at the zenith of its elevation. Manual operation of the controls is then required to cause the ramp to be depressed. When the ramp comes to rest on a vehicle surface, the motor is automatically stopped. The ramp also stops automatically, after use, after the vehicle has been removed, in a horizontal position flush with the deck of the loading platform. The operation of the device is therefore exceptionally safe, since the ramp is automatically stopped in an up position until the vehicle has been parked in a desired position adjacent the loading platform. Thus, when the ramp is not actually engaged on a vehicle surface, it is either flush with the loading platform deck, or it is clearly visible at the zenith of its elevation.

To cause the ramp to move initially, manual operation of the controls is necessary. Later, to move it from its locked up position, manual operation of the controls again is necessary. The device is thus safe since only intentional operation of the controls can cause it to move from its level locked or horizontal position. The manual stop switch 232 can be operated manually to stop the ramp at any time. It must be continuously depressed to keep the switch open, since the switch is normally closed.

While the invention has been described in connection with a specific embodiment thereof, it will be understood that it is capable of further modification, and this application is intended to cover any variations, uses, or adaptations of the invention following, in general, the principles of the invention and including such departures from the present disclosures as come within known or customary practice in the art to which the invention pertains and as may be applied to the essential features hereinbefore set forth, and as fall within the scope of the invention or the limits of the appended claims.

Having thus described my invention, what I claim is:

1. A power-operated loading dock comprising a frame. a ramp hinged at its inner end to the frame for angular movement relative thereto, a reversible electrically-controlled motor, switch means and tripping means, said switch means being mounted to be tripped at predetermined positions of said ramp, said switch means including first switch means connected to stop the motor and second switch means connected to reverse the motor, and said tripping means including first tripping means mounted to trip said first switch means to stop the motor when said ramp has been swung a predetermined distance above the horizontal, and second tripping means mounted to trip said second switch means to reverse the motor when said ramp has been swung a predetermined distance below the horizontal.

2. A power-operated loading dock comprising a frame, a ramp hinged at its inner end to the frame for angular movement thereon, a reversible, electrically-controlled motor, two members, a first of which is mounted on the ramp and the second of which is connected to the first for limited movement relative thereto, electrical switch means carried by one of said members, a trip mounted on the other of said members in position to engage and trip said switch means, transmission means actuated by said motor and operable through said second member when the motor is running in one direction to move said members to elevate the ramp and operable when the motor is running in the other direction to move said members to lower the ramp, said trip tripping said switch means to stop the motor when said members move relative to one another a predetermined distance.

3. A power-operated loading dock comprising a frame, a ramp hinged at its inner end to the frame for angular movement thereon, a reversible, electrically-controlled motor, two members, a first of which is mounted on the ramp and the second of which is connected to the first for limited movement relative thereto, electrical switch means carried by one of said members, a trip mounted on the other of said members in position to engage and trip said switch means, transmission means actuated by said motor and operable through said second member when the motor is running in one direction to move said members to elevate the ramp and operable when the motor is running in the other direction to move said members to lower the ramp, said switch means being connected to said motor to actuate said motor to run in one direction in a first position thereof, to stop said motor in a second position thereof, and to actuate said motor to run in the opposite direction in a third position thereof, said trip being mounted to trip said switch to move said switch to said first and third positions at the extreme limits of movement of said members toward and away from each other respectively and to said second position at a relative position of said members intermediate said limits.

4. A power-operated loading dock comprising a frame, a ramp hinged at its inner end to the frame for angular movement relative thereto about a horizontal axis, a reversible electric motor mounted on said frame, transmission means operatively connecting said motor to said ramp to move said ramp, said transmission means permitting movement of said ramp independent of said motor, said ramp being adapted to engage on a support that may change its elevation during said engagement, control means comprising a double throw electric switch and tripping means, one of said switch and said tripping means being mounted to move with the ramp and the other being movable relative thereto, said switch means being connected in one operative position thereof to actuate the motor to run in one direction and in a second operative position thereof to actuate the motor to run in the opposite direction and intermediate said positions to stop the motor, said tripping means being disposed to engage and to trip said switch to move it to said intermediate position to stop the motor after the ramp has been stopped by engagement of said ramp on a support and to trip said switch to an operative position thereof to start the motor upon movement of said ramp a predetermined distance in either direction from the stopped position of the ramp and to trip said switch to stop the motor after the switch has moved relative to said tripping means a predetermined distance in either direction.

5. A power-operated dock for a loading platform comprising a supporting frame, a ramp hinged at its inner end to said frame for angular movement relative thereto about a horizontal axis, a reversible electric motor, two telescoping members a first of which is mounted on the ramp and the second of which is connected to the first for limited movement relative thereto, means constantly urging said members apart, electrical switch means carried by one of said members, a trip mounted on the other of said members in position to engage and to trip said switch means, transmission means operable by said motor and engaging said second member for moving said members toward one another to elevate the ramp when the motor is running in one direction and to lower the ramp when the motor is running in the other direction, said switch means being connected to said motor to actuate said motor to run in one direction in a first position thereof, to stop said motor in said second position thereof, and to actuate said motor to run in the opposite direction in a third position thereof, said trip being mounted to trip said switch to move said switch to said first and third positions at the extreme limits of movement of said members toward and away from each other respectively and to said second position at a relative position of said members intermediate said limits.

6. A power-operated loading dock comprising a frame, a ramp hinged at its inner end to said frame for angular movement relative thereto about a horizontal axis, a reversible electric motor mounted on said frame, transmission means operatively connecting said motor to said ramp to move the ramp, said transmission means permitting movement of said ramp independent of said motor, said ramp being adapted to engage on a support that may change its elevation during said engagement, a double throw electric switch and tripping means, one of said switch and said tripping means being mounted to move with the ramp and the other being movable relative thereto, said switch being connected in one operative position thereof to actuate the motor to run in one direction and in a second operative position thereof to actuate the motor to run in the opposite direction and intermediate said positions to stop the motor, said tripping means being disposed to engage and to trip said switch to move it to said intermediate position to stop the motor after said ramp has been stopped by engagement on a support and to trip said switch to an operative position thereof to start the motor upon movement of said ramp a predetermined distance in either direction from the stopped position of the ramp and to stop the motor after the switch has moved relative to said tripping means a predetermined distance in either direction, second switch means and second tripping means associated therewith, said second switch means being mounted to be tripped at predetermined positions of said ramp, said second switch means including a first switch connected to stop the motor and a second switch connected to reverse the motor, and said second tripping means including a first trip mounted to trip said first switch to stop the motor when said ramp has been swung to a predetermined position above the horizontal, and a second trip mounted to trip said second switch to reverse the motor when said ramp has been swung to a predetermined position below the horizontal, support means pivotally mounted on said frame for movement between two extreme positions and adapted to support said ramp at a preselected angular position in one said extreme position of said support means, a toggle joint interconnecting said frame and said support means and comprising a pair of links that are pivotally interconnected, one of said links comprising a pair of telescoping members that are interconnected for limited relative movement, spring means constantly urging said members apart, said toggle joint being mounted to permit movement of said links through in-line disposition to two extreme positions at opposite sides of said in-line position and corresponding respectively to the two extreme positions of said support means, said spring-pressed members serving constantly to urge said toggle and said support means to one or the other of said extreme positions thereof, means mounted on said ramp to trip said toggle to shift the toggle and said support means at said downward position of the ramp toward ramp-supporting position and to shift said toggle and said support means at said upward position of said ramp away from said ramp-supporting position, and third switch means and third tripping means assoicated therewith, one of said third means being mounted on said frame, said third switch means being connected to said motor to reverse said motor, and said third tripping means being disposed to engage and to trip said third switch means to reverse said motor as said ramp is swung upwardly above said preselected angular position, to lower said ramp to be supported on said support means.

7. A power-operated loading dock comprising a supporting frame, a ramp hinged at its inner end to said frame for angular movement relative thereto about a horizontal axis, a reversible electric motor mounted on said frame, manually operable electric switch means operatively connected to stop said motor and to actuate said motor to operate in both directions, transmission means operatively connecting said motor to said ramp to move said ramp, second electrical switch means and tripping means associated therewith, one of which is mounted on said ramp and the other of which is secured to said frame, said second switch means being operatively connected to reverse said motor, said tripping means being mounted to trip said second switch means to reverse said motor when said ramp has been swung a predetermined distance below horizontal, and means comprising a part of said frame on which said ramp is engageable to support the ramp at said predetermined distance below horizontal.

8. A power-operated loading dock comprising a supporting frame, a ramp hinged at its inner end to said frame for angular movement relative thereto about a horizontal axis, a reversible electric motor mounted on said frame, manually operable electric switch means operatively connected to stop said motor and to actuate said motor to operate in either direction, transmission means operatively connecting said motor to said ramp to move said ramp, second electrical switch means and tripping means associated therewith, one of which is mounted on said ramp and the other of which is secured to said frame, said second switch means being operatively connected to reverse said motor, said tripping means being mounted to trip said second switch means to reverse said motor when said ramp has been swung a predetermined distance below horizontal, means comprising a part of said frame on which said ramp is engageable to support the ramp at said predetermined distance below horizontal, third switch means and tripping means associated therewith, one of which is carried by the ramp and the other of which is secured to the frame, said third switch means being connected to said motor to stop the motor, and said tripping means for said third switch means being mounted to trip this switch means to stop the motor when said ramp has been swung a predetermined distance above the horizontal.

9. A power-operated loading dock comprising a supporting frame, a ramp hinged at its inner end to said frame for angular movement thereon, a reversible electric motor, two members, a first of which is mounted on the ramp and the second of which is connected to the first for limited movement relative thereto, an electrical switch means carried by one of said members, a trip mounted on the other of said members and positioned to engage and trip said switch means, transmission means actuated by said motor and operable through said second member when the motor is running in one direction to move said members to elevate the ramp and operable when the motor is running in the other direction to move said members to lower the ramp, said trip tripping said switch means to stop the motor when said members move relative to one another a predetermined distance, manually operated electric switch means operatively connected to stop and to actuate said motor to operate in either direction, third switch means and tripping means associated therewith, one of which is mounted on said ramp and the other of which is secured to the frame, said third switch means being operatively connected to reverse the motor, said tripping means for said third switch means being mounted to trip said third switch means to reverse said motor when said ramp has been swung a predetermined distance below horizontal, and means comprising a part of said frame on which said ramp is engageable to support said ramp at said predetermined distance below horizontal.

10. A power-operated dock comprising a frame, a ramp hinged at its inner end to the frame for angular movement thereon, a reversible electric motor, two members a first of which is mounted on the ramp and the second of which is connected to the first for limited movement relative thereto, electrical switch means carried by one of said members, a trip mounted on the other of said members and positioned to engage and trip said switch means, transmission means actuated by said motor and operable through said second member when the motor is running in one direction to move said members to elevate the ramp and operable when the motor is running in the other direction to move said members to lower the ramp, said switch means being connected to said motor to actuate said motor to run in one direction in a first position thereof, to stop said motor in a second position thereof, and to actuate said motor to run in the opposite direction in a third position thereof, said trip being mounted to trip said switch to move said switch to said first and third positions at the extreme limits of movement of said members toward and away from each other respectively and to said second position at a relative position of said members intermediate said limits, manually operable electric switch means operatively connected to stop and to actuate said motor to operate in either direction, third electrical switch means and tripping means associated therewith, one of which is mounted on said ramp and the other of which is secured to the frame, said third switch means being operatively connected to reverse said motor, said tripping means for said third switch means being mounted to trip said third switch means to reverse said motor when said ramp has been swung a predetermined distance below horizontal, means comprising a part of said frame on which said ramp is engageable to support the ramp at said predetermined distance below horizontal, and fourth switch means and tripping means associated therewith one of which is carried by the ramp and the other of which is secured to the frame, said fourth switch means being connected to said motor to stop the motor, and said tripping means for said fourth switch means being mounted to trip said fourth switch means to stop said motor when said ramp has been swung a predetermined distance above the horizontal.

11. A power-operated loading dock comprising a frame, a ramp hinged at its inner end to the frame for angular movement relative thereto about a horizontal axis, a reversible electric motor mounted on said frame, transmission means operatively connecting said motor to said ramp to move the ramp, said transmission means permitting movement of said ramp independent of said motor, said ramp being adapted to engage on a support that may change its elevation during said engagement, a double throw electric switch and tripping means associated therewith, one of said switch and said tripping means being mounted to move with the ramp, said switch being connected in one operative position thereof to actuate the motor to run in one direction and in the second operative position thereof to actuate the motor to run in the opposite direction and intermediate said positions to stop the motor, said tripping means being disposed to engage and to trip said switch to move it to said intermediate position to stop the motor after said ramp has been stopped by engagement on a support and to trip said switch to an operative position thereof to start the motor upon movement of said ramp a predetermined distance in either direction from the stopped position of the ramp and to stop the motor after the switch has moved relative to the trip a predetermined distance in either direction, manually operable electric switch means operatively connected to stop and to actuate said motor to operate in both directions, third electric switch means and tripping means associated therewith one of which is mounted on said ramp and the other of which is secured to the frame, said third switch means being operatively connected to reverse the motor, said tripping means for said third switch means being mounted to trip said third switch means to reverse the motor when said ramp has been swung a predetermined distance below horizontal, and means comprising a part of said frame on which said ramp is engageable to support the ramp at said predetermined distance below horizontal.

12. A power-operated loading dock comprising a ramp, a ramp hinged at its inner end to the frame for angular movement relative thereto about a horizontal axis, a reversible electric motor mounted on said frame, transmission means operatively connecting said motor to said ramp to move said ramp and permitting movement of said ramp independent of said motor, said ramp being adapted to engage on a support that may change its elevation during said engagement, a double throw electric switch and tripping means therefor, one of said switch and tripping means being mounted to move with the ramp and the other being movable relative thereto, said switch being connected in one operative position thereof to actuate the motor to run in one direction and in a second operative position thereof to actuate the motor to run in the opposite direction and intermediate said positions to stop the motor, said tripping means being disposed to engage and to trip said switch to move it to said intermediate position to stop the motor after said ramp has been stopped by engagement on a support and to trip said switch to an operative position thereof to start the motor upon movement of said ramp a predetermined distance in either direction from the stopped position of the ramp and to stop the motor after the switch has moved relative to the trip a predetermined distance in either direction, second switch means and tripping means associated therewith, one of said second means being carried by the ramp and the other being secured to the frame, said second switch means being connected to said motor to stop the motor, and said second tripping means being mounted to trip said second switch means to stop said motor when said ramp has been swung a predetermined distance above the horizontal.

13. A power-operated loading dock comprising a frame, a ramp hinged at its inner end to the frame of angular movement relative thereto about a horizontal axis, a reversible electric motor mounted on said frame, transmission means operatively connecting said motor to said ramp to move said ramp and permitting movement of said ramp independent of said motor, said ramp being adapted to engage on a support that may change its elevation during said engagement, a double throw electric switch and tripping means therefor, one of said switch and tripping means being mounted to move with the ramp and the other being movable relative thereto, said switch being connected in one operative position thereof to actuate the motor to run in one direction and in a second operative position thereof to actuate the motor to run in the opposite direction and intermediate said positions to stop the motor, said tripping means being disposed to engage and to trip said switch to move it to said intermediate position to stop the motor after said ramp has been stopped by engagement on a support and to trip said switch to an operative position thereof to start the motor upon movement of said ramp a predetermined distance in either direction from the stopped position of the ramp and to stop the motor after the switch has been moved relative to the trip a predetermined distance in either direction, second switch means and tripping means associated therewith, one of said second means being carried by the ramp and the other being secured to the frame, said second switch means being connected to said motor to stop the motor, and said second tripping means being mounted to trip said second switch means to stop said motor when said ramp has been swung a predetermined distance above the horizontal, and third switch means and tripping means associated therewith, one of said third means being carried by the ramp and the other being secured to the frame, said third switch means being connected to said motor to reverse the motor, and said tripping means for said third switch means being mounted to trip said third switch means to reverse the motor when said ramp has swung a predetermined distance below the horizontal.

14. A power-operated dock for a loading platform comprising a supporting frame, a ramp hinged at its inner end to said frame for angular movement relative thereto about a horizontal axis, a reversible electric motor mounted on said frame, manually operable electric switch means operatively connected to stop and to actuate said motor to operate in both directions, transmission means operatively connecting said motor to said ramp to move said ramp, second switch means and tripping means associated therewith one of which is mounted on said ramp and the other of which is secured to the frame, said second switch means being connected to said motor to stop the motor, said tripping means for said second switch means being mounted to trip said second switch means to stop said motor when said ramp has been swung a predetermined distance above the horizontal, third switch means and tripping means associated therewith one of which is mounted on said ramp and the other of which is secured to the frame, said third switch means being operatively connected to reverse said motor, said tripping means for said third switch means being mounted to trip said third switch means to reverse said motor when said ramp has been swung a predetermined distance below horizontal, means comprising a part of said frame on which said ramp is engageable to support the ramp at said predetermined distance below horizontal, support means pivotally mounted on said frame for movement between two extreme positions and adapted in one of said extreme positions to support said ramp flush with said platform, means mounted on said ramp to pivot said support means to its extreme non-support position as said ramp is swung to said predetermined distance above horizontal, means mounted on said ramp to pivot said support means to support position as said ramp is swung to said predetermined distance below horizontal, and fourth switch means and tripping means associated therewith one of which is mounted on said frame, said fourth switch means being connected to said motor to reverse said motor, and said tripping means for said fourth switch means being disposed to engage and to trip said fourth switch means to reverse said motor as said ramp is swung upwardly through and above a position flush with the platform, to lower said ramp to be supported on said support means.

15. The power-operated dock of claim 14, said ramp being adapted to engage on a support that may change its elevation during said engagement, including a double throw electric switch and tripping means therefor one of said switch and said tripping means being mounted to move with the ramp, and the other being movable relative thereto, said double throw switch being connected in one operative position thereof to actuate the motor to run in one direction and in a second operative position thereof to actuate the motor to run in the opposite direction and intermediate said positions to stop the motor, said tripping means for said double throw switch being disposed to engage and to trip said switch to move it to said intermediate position to stop said motor after said ramp has been stopped by engagement on a support and to trip said switch to an operative position thereof to start the motor upon movement of said ramp a predetermined distance in either direction from the stopped position of the ramp and to stop the motor after the switch has moved relative to the trip a predetermined distance in either direction.

16. The power-operated dock of claim 14, including cam means mounted on said ramp and operative as said ramp is swung upwardly from below horizontal to hold said support means from said support position at least until said ramp has been swung upwardly past a position flush with said platform, and spring means mounted to be operative constantly to press said support means toward said support position as said ramp is swung upwardly from below horizontal.

17. A power-operated loading dock comprising a supporting frame, a ramp hinged at its inner end to said frame for angular movement relative thereto about a horizontal axis, a reversible electric motor mounted on said frame, manually operable electric switch means operatively connected to stop said motor and to actuate said motor to operate in both directions, transmission means operatively connecting said motor to said ramp to move said ramp, second switch means and second tripping means associated therewith one of which is mounted on the ramp, said second switch means being connected to said motor to stop the motor, said tripping means for said second switch means being mounted to trip said second switch means to stop said motor when said ramp has been swung a predetermined distance above the horizontal, third switch means and tripping means associated therewith one of which is mounted on the ramp, said third switch means being connected to said motor to reverse the motor, said tripping means for said third switch means being mounted to trip said third switch means to reverse the motor when said ramp has been swung a predetermined distance below the horizontal, said ramp being adapted to engage on a support that may change its elevation during said engagement, and a double throw electric switch and tripping means therefor, one of which is mounted to move with the ramp and the other of which is movable relative thereto, said double throw switch being connected in one operative position thereof to actuate the motor to run in one direction and in a second operative position thereof to actuate the motor to run in the opposite direction and intermediate said positions to stop the motor, said tripping means being disposed to engage and to trip said double throw switch to move it to said intermediate position to stop the motor after said ramp has been stopped by engagement on a support and to trip said switch to an operative position thereof to start the motor upon movement of the ramp a predetermined distance in either direction from the stopped position of the ramp and to stop the motor after the switch has moved relative to said tripping means a predetermined distance in either direction.

References Cited in the file of this patent

UNITED STATES PATENTS

| | | |
|---|---|---|
| 528,547 | Marshall | Nov. 6, 1894 |
| 1,253,832 | Jira | Jan. 15, 1918 |
| 1,905,947 | Morgan | Apr. 25, 1933 |
| 2,228,796 | Warren | Jan. 14, 1941 |
| 2,489,869 | Dunn | Nov. 29, 1949 |
| 2,560,064 | Astry | July 10, 1951 |
| 2,639,450 | Ramer | May 26, 1953 |
| 2,644,971 | Rowe | July 14, 1953 |
| 2,714,735 | Watson | Aug. 9, 1955 |